Figure 1:
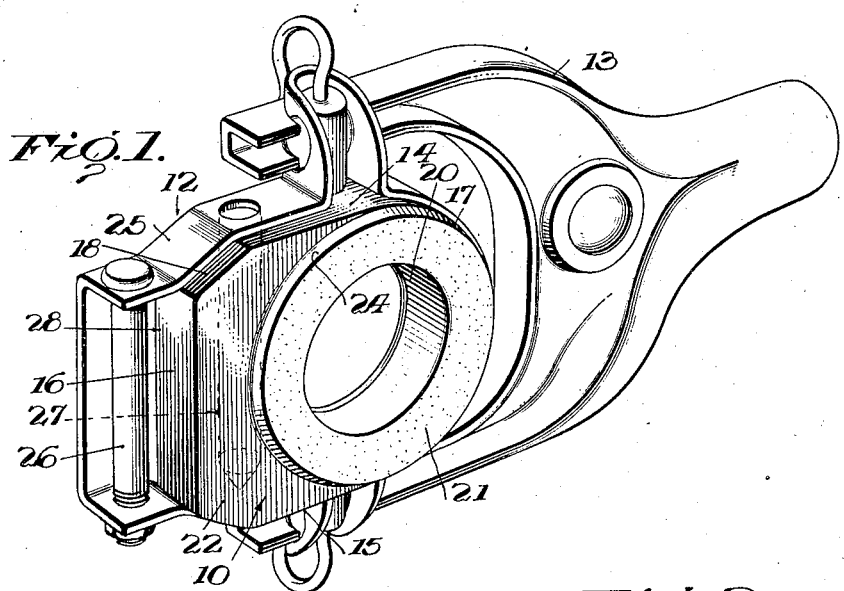

Sept. 21, 1937. M. S. MAY 2,093,800

BEARING AND METHOD OF MANUFACTURING SAME

Filed Aug. 8, 1934

Inventor

Millard S. May

By Steward & McKay his Attorneys

Patented Sept. 21, 1937

2,093,800

UNITED STATES PATENT OFFICE 2,093,800

BEARING AND METHOD OF MANUFACTURING SAME

Millard S. May, St. Marys, Pa., assignor to Speer Carbon Company, St. Marys, Pa., a corporation of Pennsylvania Application August 8, 1934, Serial No. 739,028

1 Claim. (Cl. 308—168)

This invention relates generally to bearings and methods of manufacturing same; and it relates particularly to bearings formed from porous material such as carbon, graphite or carbon composition, in which lubricant is intended to seep or exude from the interior of the bearing body or block at the active bearing surface. Bearings embodying this invention are particularly suitable for use as release or throw-out bearings for automobile clutches, but the invention is of general application and is not limited to bearings of this particular type.

Proper lubrication of bearings of the type described has been a problem not altogether satisfactorily solved heretofore. It has been proposed to supply lubricant to some surface other than the bearing surface of the bearing and have the lubricant work its way through the pores thereby to lubricate the bearing surface. This arrangement has not been satisfactory, however, because the lubricant would work its way through and appear on surfaces other than the bearing surface as well as on the bearing surface. This was not only "messy" and wasteful of lubricant, but also deprived the bearing surface of lubricant intended for it.

One of the principal objects of the present invention is to overcome the objections noted in connection with the prior art and to provide a bearing of the general character described which, however, can be lubricated efficiently and easily without any waste of lubricant.

Another object of the invention is to provide a bearing which will automatically lubricate itself, conserving the supply of lubricant and directing it to the bearing surface exclusively, or substantially so.

A further object is to provide a novel method or procedure for manufacturing such a bearing.

With these and other objects in view which, together with the novel features and advantages, will become apparent from the following description taken in conjunction with the accompanying drawing illustrating one practical form of bearing embodying the invention, the invention comprises the novel bearing, together with the novel method and method steps of manufacturing the same, which will first be explained by means of an illustrative example embodying in desirable practical form the underlying principles involved, and will then be more particularly pointed out.

Figure 2:
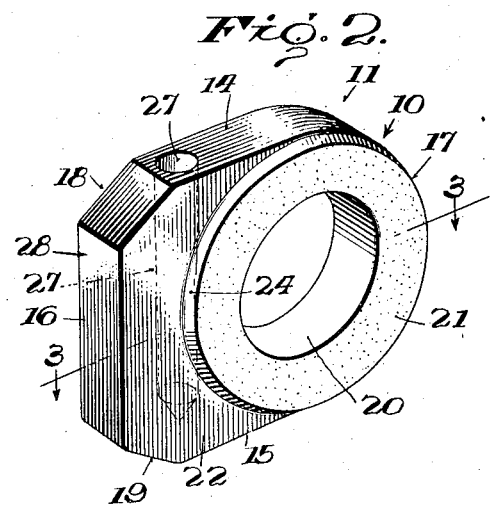
Figure 3:
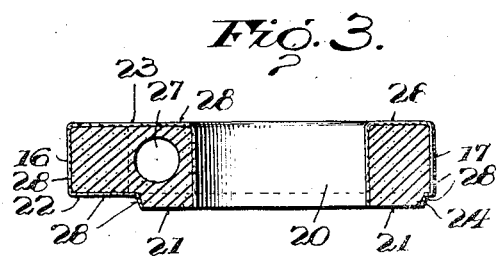

In the drawing:

Fig. 1 is a perspective view of a bearing embodying the invention, the bearing being shown mounted ready for use as a throw-out bearing of an automobile clutch, Fig. 2 is a view similar to Fig. 1 of the bearing by itself, and Fig. 3 is a sectional view on the line 3—3 of Fig. 2.

Generally described, the invention consists in rendering all exposed surfaces of the porous bearing, except the active bearing surface, substantially impervious to penetration by oil or grease, thus preventing exudation of lubricant from the bearing except at such active bearing surface where it is needed. Ordinarily this is best accomplished in practice by coating or superficially impregnating the exposed non-active surfaces of the bearing member with coating material which seals those surfaces and is not attacked by the lubricant used in the bearing. Various sealing materials are available for this purpose; but those comprising an artificial resin of the bakelite type are found to be especially suitable.

For the sake of convenience in further explaining the principles involved, the invention will be illustrated and described as embodied in the bearing block of an automobile clutch release or throw-out, in which a release or throw-out bearing block of porous material (e. g. electro-graphite) impregnated with a lubricant engages or presses against a clutch release sleeve to release the clutch. In the use of such a throw-out bearing, actuation of the clutch-release lever about its pivot causes the bearing block to press against the end of the clutch-release sleeve and move it axially along the clutch shaft, axial movement of said sleeve operating the levers which in turn move the driven and driving clutch members out of clutching engagement, whereby the clutch is released.

Referring to the drawing, 10 indicates generally the novel bearing embodying this invention. As designed for use as a throw-out bearing for an automobile clutch, it comprises a block or body 11 of porous material, such as carbon, graphite (electro-graphite) or carbon composition, having capillary pores for seepage or flow of lubricant therethrough; said body being supported or held by a holder 12 which in turn is pivotally supported by the forked end of a pivoted clutch release lever 13. The bearing block or body may be of any suitable or desired shape and construction and any desired or suitable means of holding or supporting said block may be used, but, in the example illustrated, plate or block 11 has two parallel side walls 14 and 15, an end wall 16 perpendicular thereto, and a semi-circular end wall 17, the corners at the junction of the side walls and end wall 16 being cut off or beveled at 18 and 19, respectively, in this particular instance. Body 11 is provided adjacent to but spaced from the semi-circular end wall 17 with a circular opening or hole 20 for the clutch shaft; and surrounding said opening is a flat annular surface 21, which is the only active bearing surface in this form of bearing, and which alone requires lubrication. This annular bearing face, which is concentric with circular opening 20 and end wall 17, is here shown as elevated or raised above the flat front face 22 and parallel to the flat rear face 23, the peripheral edge 24 of the bearing face being desirably beveled.

As shown in Fig. 1, the bearing block is supported or mounted in the aforesaid holder 12 which, in the form here illustrated by way of example, is formed of pressed metal having a peripheral flange 25 which fits around the bearing block, the latter being held or clamped in place by suitable fastening means such as 26 passing through projecting ends of said flange. As previously pointed out, however, any suitable means for supporting or holding the bearing block may be used. For instance, the holder can be cast or shrunk on the bearing block, if desired.

The bearing block 11 is provided with any suitable means for supplying lubricant to the bearing surface and in the present instance lubrication of the bearing surface is effected by providing a cavity or reservoir 27 for receiving a supply of oil or other lubricant which seeps or percolates through the pores of the porous material of which the bearing block is made. However, other means of lubricating the bearing may be provided; for instance, lubricant can be supplied from a reservoir provided in the holder, if desired. But the distinctive feature of the present invention, whereby the hereinabove stated objections and disadvantages heretofore characterizing porous bearings are overcome, consists in preventing the lubricant from coming out on surfaces other than the bearing surface by so modifying said surfaces, through suitable treatment, as substantially to seal them or render them impervious to the lubricant to be used in the bearing. In practice, this object is usually attained most conveniently and effectively by providing such surfaces with a tenaciously adherent coating 28 of an oil-impervious or non-porous material which effectually seals said surfaces against exudation of lubricant therefrom. In other words, the side walls 14 and 15, the end walls 16 and 17, the corner portions 18 and 19, the wall of opening 20 and the beveled edge 24 are all coated with such a material, leaving only cavity or reservoir 27 and bearing face 21 uncoated; leaving the active bearing surface 21 as the only exposed surface from which lubricant can exude. Thus it will be seen that the supply of lubricant is conserved and more lubricant will be provided for the bearing surface proper, where it is required.

Any suitable material which will provide a tenaciously adherent and substantially impervious or lubricant-insoluble coating may be used, within the broad scope of the invention, and the specific procedure of applying the coating may also vary widely; but in practice the use of an artificial resin, such as a phenolic condensation product, applied as a varnish and subsequently hardened, has been found very desirable. In a typical example illustrating how the novel method embodying this invention may advantageously be carried out in practice, a bearing, completely finished except for the removal of a layer of material from the bearing surface, is dipped into a solution composed of:

| 50% artificial resin or bakelite varnish | 60% solid resin 40% solvent |
|---|---|
| 50% solvent | 90% benzol 10% methanol | i. e. the thinned varnish contains 30% solid resin. This resin is only partially cured and must be heated to polymerize it and render it infusible and insoluble.

After dipping, the bearing is air dried for an hour or more, dried at around 65° C. for about one hour, and then cured at around 105° C. for about twelve hours, usually over night. It is finally baked at 200–250° C. for about two hours. As a result of this treatment, the entire outer surface of the bearing member is provided with a thin protective coating of the hardened resin. The coating on the active bearing surface 21 is then ground off, and this face is then surfaced exactly, usually about two to three thousandths of an inch being allowed for this. The lubricant cavity or reservoir is either plugged when the coating is done or it can be drilled in later. Instead of being dipped in the resin varnish, the bearing can be covered with the resin by means of a brush or by spraying, but dipping is preferable because of economy and the ease with which it can be done. In either case the resin solution evidently penetrates to some extent below the outer surface of the porous bearing block and thus impregnates it superficially. Hence, the final hardened coating is firmly locked to the surface of the block because of this slight superficial impregnation and its tenacious adherence to the block is enhanced.

The coated bearing is then treated with a wax, such as paraffin, by immersing it in the melted wax at around 200° C. for about four hours. The bearing is then allowed to drain and cool, with the lubricant cavity down, and is then ready for insertion in the holder.

While the use of a thermo-setting phenolic resin coating of the type known under the trade names of Bakelite, Durez, Durite, Resinox, etc. is preferable, other types of resins could also be used. The particular kind of resin or other coating used is not material so long as it adheres to the bearing, does not crack under cold or flow at the highest operating temperatures encountered in service, usually around 260° C., and is substantially unaffected by and impervious to the paraffin or the oil or other lubricant used. Numerous variations in the coating composition, as well as in the specific mode of application, are therefore permissible within the scope of the invention.

Furthermore, in its broader aspects, it is to be understood as involving broadly any mode of rendering all outer surfaces of a porous bearing member oil impervious, except the active bearing surface from which it is desired lubricant shall exude; and that accordingly the invention is not limited to the method of accomplishing this hereinabove described by way of explanatory example.

Furthermore, as previously emphasized, although a porous bearing embodying the invention has been described by way of example as designed for use as a throw-out bearing for automobiles, the invention is not limited to bearings for such use but is applicable in connection with porous bearings of all kinds which carry the oil or other lubricant through capillary pores in the body of the bearing material.

What is claimed is:

A non-metallic bearing formed mainly of carbon material permeable to lubricants and provided with an integral lubricant reservoir therein for supplying lubricant to the bearing surface through the pores, said bearing having all except the bearing surface covered with a substantially impervious lubricant-insoluble material.

MILLARD S. MAY.